United States Patent [19]
Yoshinaga

[11] Patent Number: 5,418,900
[45] Date of Patent: May 23, 1995

[54] IMAGE EXPANSION DEVICE

[75] Inventor: Tomoji Yoshinaga, Osaka, Japan

[73] Assignee: Kabushiki Kaisha Toei System, Osaka, Japan

[21] Appl. No.: 184,506

[22] Filed: Jan. 19, 1994

[30] Foreign Application Priority Data

Nov. 11, 1993 [JP] Japan .................................. 5-307188

[51] Int. Cl.⁶ .............................................. G06T 3/40
[52] U.S. Cl. ..................................... 395/139; 395/133;
 395/162; 348/36
[58] Field of Search .................. 395/133-139,
 395/140-143, 123, 127, 153, 154, 162, 165, 166;
 345/1, 4; 348/36-39, 383

[56] References Cited
U.S. PATENT DOCUMENTS

5,159,666 10/1992 Fukuda et al. ...................... 395/139
5,301,265 4/1994 Itoh ..................................... 395/139

Primary Examiner—Almis R. Jankus
Attorney, Agent, or Firm—Edwin D. Schindler

[57] ABSTRACT

This invention relates to an image expansion device which comprises an A/D converter, a memory block, a control section, and a D/A converter; said control section is provided with image processing means which performs arithmetic processing by {m(=the number of image equipments arranged in the horizontal direction)×d(=the image display portion in the horizontal direction of one image equipment)+(m−1)×(c(=the sum in length of the image display and non-display portion in the horizontal direction of one image display equipment)−d)}÷d, and {n(=the number of image devices arranged in the vertical direction)×b(=the image display portion in the vertical direction of one image equipment)+(n−1)×(a(=the sum in length of the image display and non-display portion in the vertical direction of one image equipment)−b)}÷b, and then performs expansion processing based on the results of the arithmetic processing.

2 Claims, 6 Drawing Sheets

IMAGE EXPANSION DEVICE

FIELD OF THE INVENTION

This invention relates to an image expansion device and the object of the present invention is to provide an image expansion device which can readily expand an image without the image data being protruded beyond screens of image equipments, a required number of which are arranged in the horizontal direction and in the vertical direction respectively.

DESCRIPTION OF PRIOR ART

Heretofore, as an image expansion device having a function of expanding and displaying an image of one frame, there is, for example, a technics disclosed in Japan Open Publication of Patent Application No. hei3-283881.

The disclosed technics has been provided with n units of image processors which, with signals performing interlace scanning taken as a source, can store an image of one frame interval in a frame memory, divide one frame of the stored information into n portions (n: integer of 2 or more), and output each one portion among those thus divided by interlace scanning to respective monitor to display; and means which expands the image stored in said frame memory by scanning one frame with either a first field or a second field through interlace scanning.

PROBLEMS OF PRIOR ART

Figure 8:
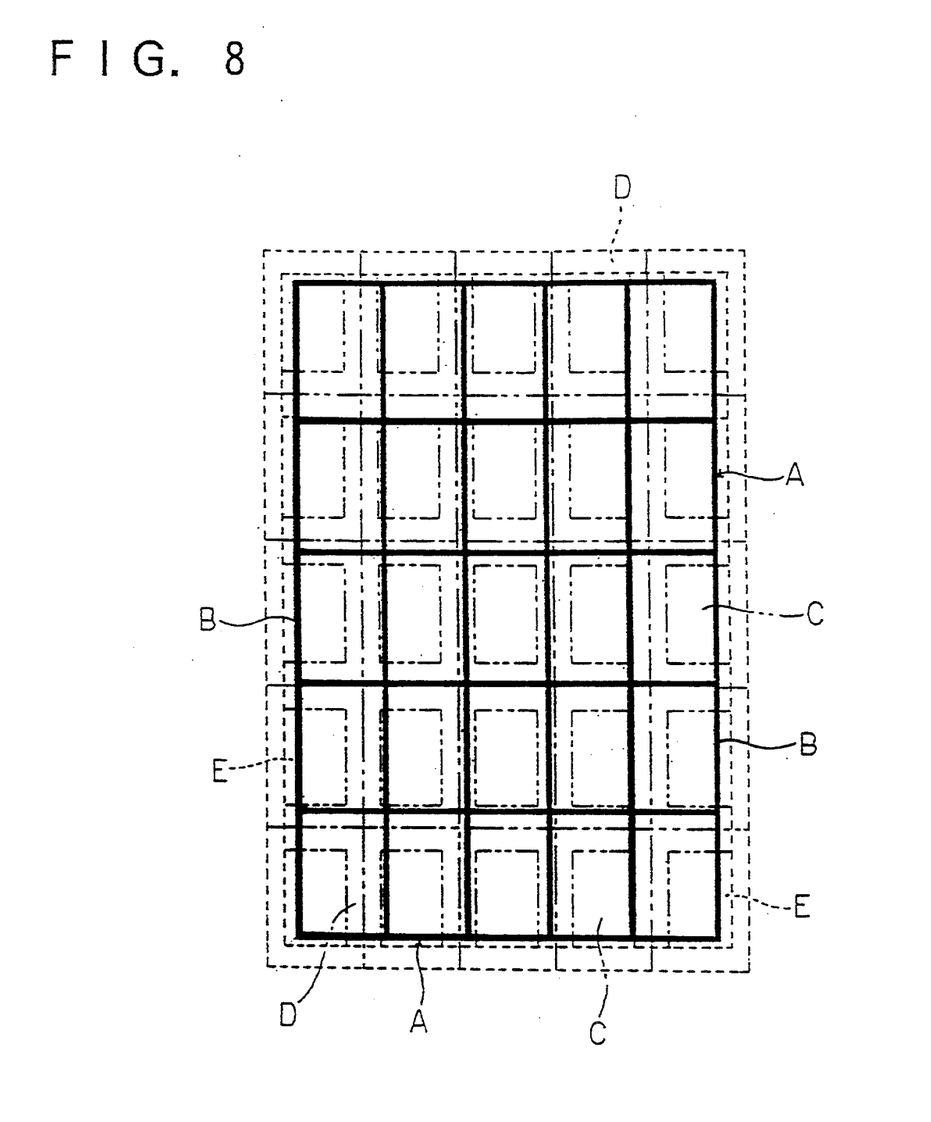
FIG. 8 is a schematic explanatory drawing showing the state expanded by a prior image expansion device.

For example, in FIG. 8, image equipments (A) (A)—are arranged such that five units in the horizontal direction and five units in the vertical direction, thus 25 units in total are arranged. One frames (B) (B) of the image equipments (A) (A)—are expanded, as they are, in the horizontal direction and in the vertical direction by the number of the image equipments (A) (A)—arranged in the horizontal direction and in the vertical direction respectively, that is, in the Example in the Figure, they are expanded by five respectively in the horizontal direction and in the vertical direction to display images of one frames (B) (B)—.

Assuming that the image equipments (A) (A) are of cathode-ray tube, the equipments would expand and display even signal portions without image data (hereinafter called image non-display portions (D) (D)—) such as synchronizing portions shown with two-dot chain line in FIG. 8.

Accordingly, data (E) (E)—of the end portions of image display portions (C) (C)—would be protruded beyond screens, whereby the data could not be displayed.

Even though the free-running frequency of a vertical deflection oscillator (not shown) and of a horizontal deflection oscillator (not shown) is adjusted in order to display the data (E) (E)—of the end portions of image protruded beyond the screens, it has been difficult to expand and display the image without the image data being protruded beyond the screens of the image equipments (A) (A)—, a required number of which are arranged in the horizontal direction and in the vertical direction.

Moreover, where the image devices (A) (A)—are not provided with said vertical deflection oscillator and said horizontal deflection oscillator, the magnitude in the horizontal and vertical directions can not be adjusted so that it has been impossible to display the data (E) (E)—of the end portions of image.

Then, in consideration of the above-mentioned problems, the present inventor has diligently studied over an image expansion device which can readily expand an image without the image data being protruded beyond screens of image equipments, a required number of which are arranged in the horizontal direction and in the vertical direction.

SUMMARY OF THE INVENTION

This invention relates to an image expansion device which arranges a required number of image equipments in the horizontal direction and in the vertical direction respectively, expands an image of one frame in both directions by the number of image equipments arranged in the horizontal direction and in the vertical direction, and displays an image; said device comprising an A/D converter for A/D converting RGB signals, a memory block for storing A/D converted digital signals, a control section for controlling at least digital signals stored in said memory block, and a D/A converter for D/A converting digital signals outputted from the memory block; and characterized in that the control section is provided with image processing means which performs arithmetic processing on the following expressions, $\{m \times d + (m-1) \times (c-d)\} \div d$, and $\{n \times b + (n-1) \times (a-b)\} \div b$, and then performs expansion processing based on the results of the arithmetic processing so that only the image display portion among images of one frames stored in the memory block can be expanded and displayed.

m is the number of image equipments arranged in the horizontal direction, c is the sum in length of the image display portion in the horizontal direction and the image non-display portion in the horizontal direction of one image display equipment, d is the image display portion in the horizontal direction of one image equipment, n is the number of image equipments arranged in the vertical direction, a is the sum in length of the image display portion in the vertical direction and the image non-display portion in the vertical direction of one image equipment, and b is the image display portion in the vertical direction of one image equipment.

EMBODIMENT

An image expansion device relating to this invention will be described hereafter based on Figures.

Figure 1:
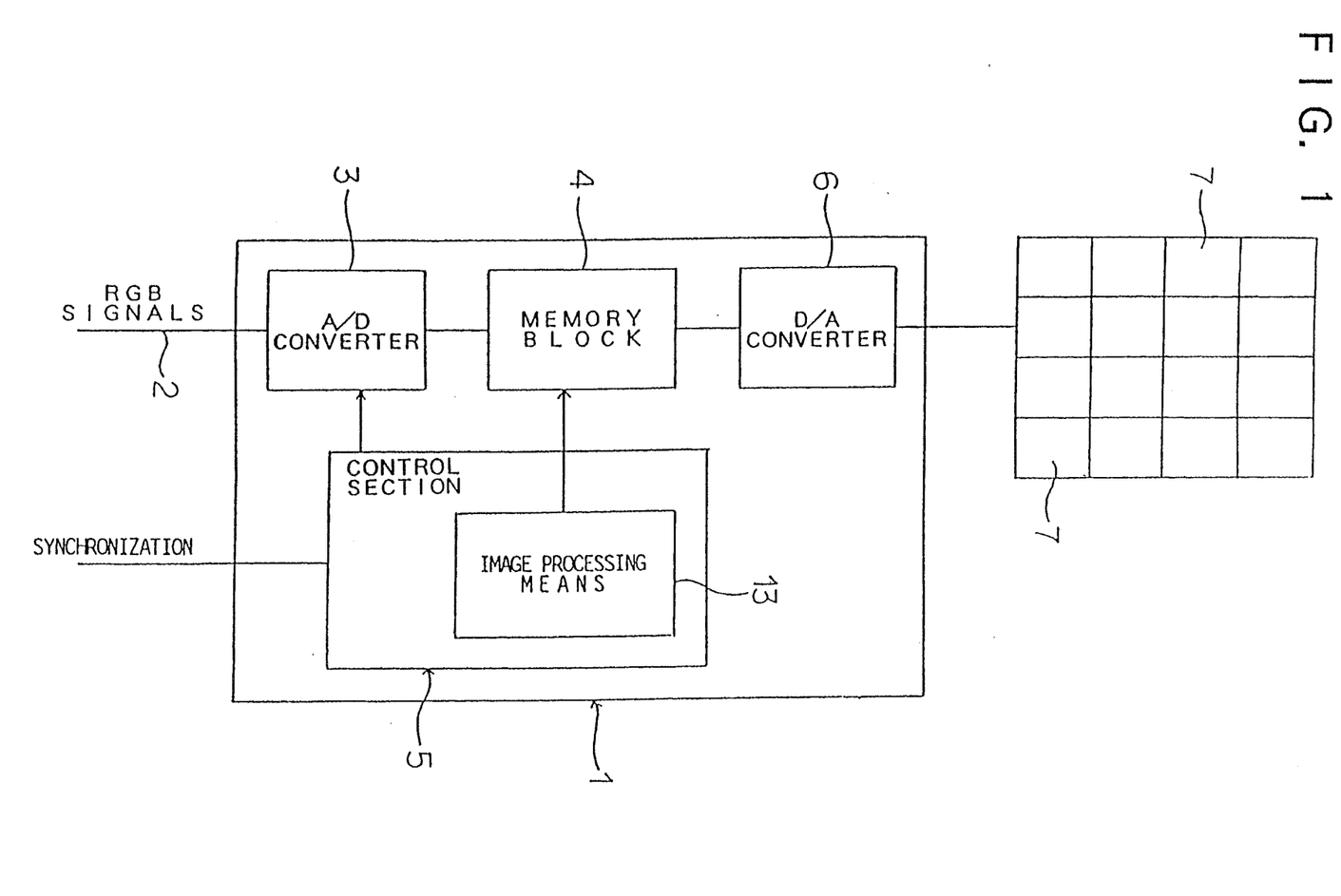
FIG. 1 is a block diagram showing an image expansion device relating to one embodiment of this invention.
Figure 2:
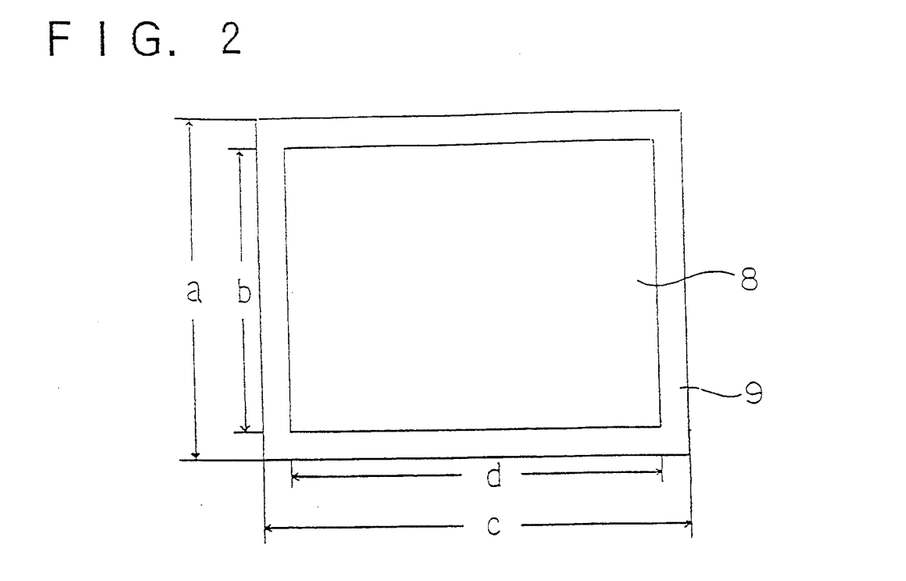
FIG. 2 is an explanatory drawing showing an image equipment.
Figure 3:
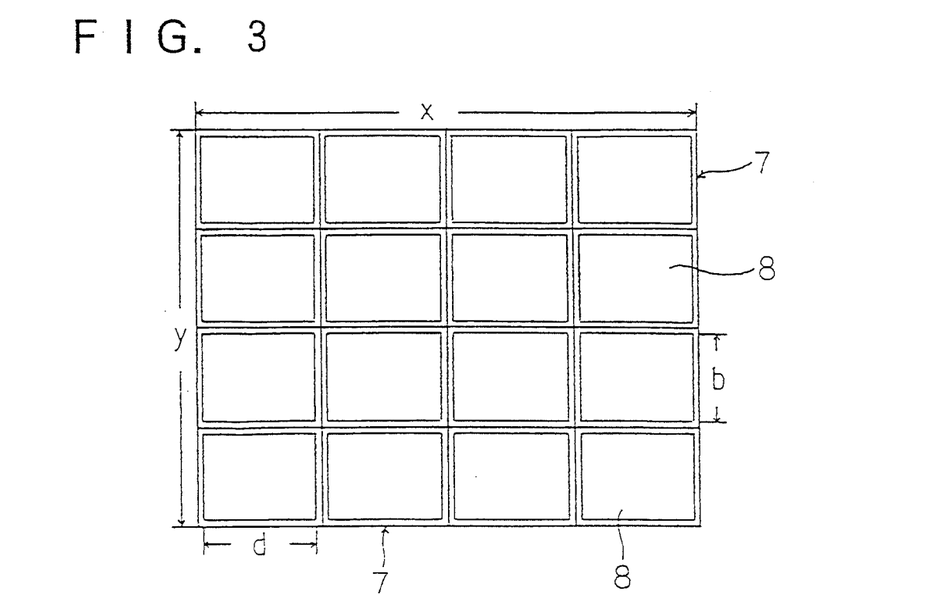
FIG. 3 is an explanatory drawing showing the state that a necessary number of the image equipments device of FIG. 2 are arranged in the horizontal direction and in the vertical direction.
Figure 4:
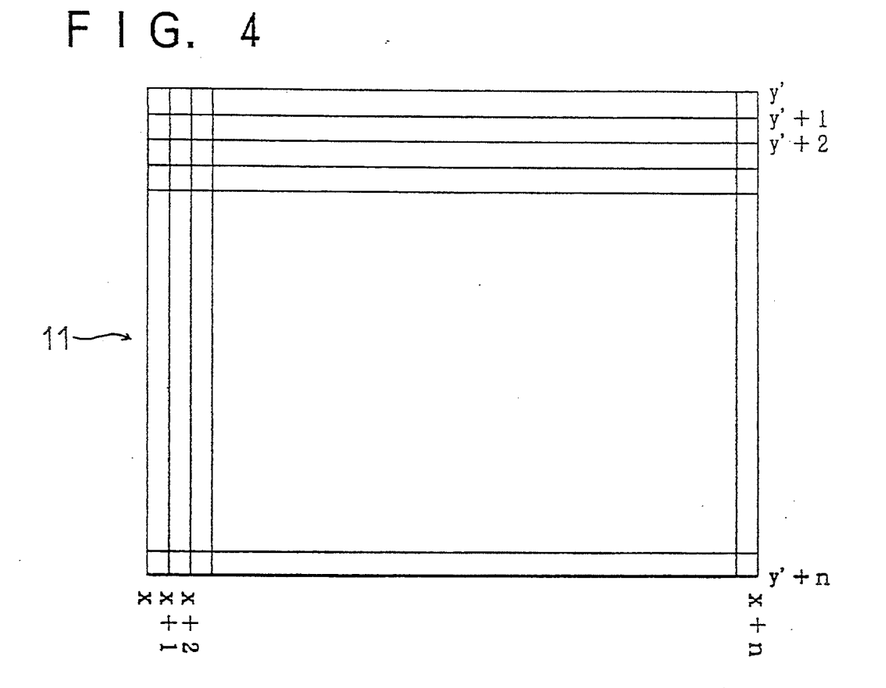
FIG. 4 is a structural drawing showing a first field of one image display portion of an image by digital signals divided into 16.
Figure 5:
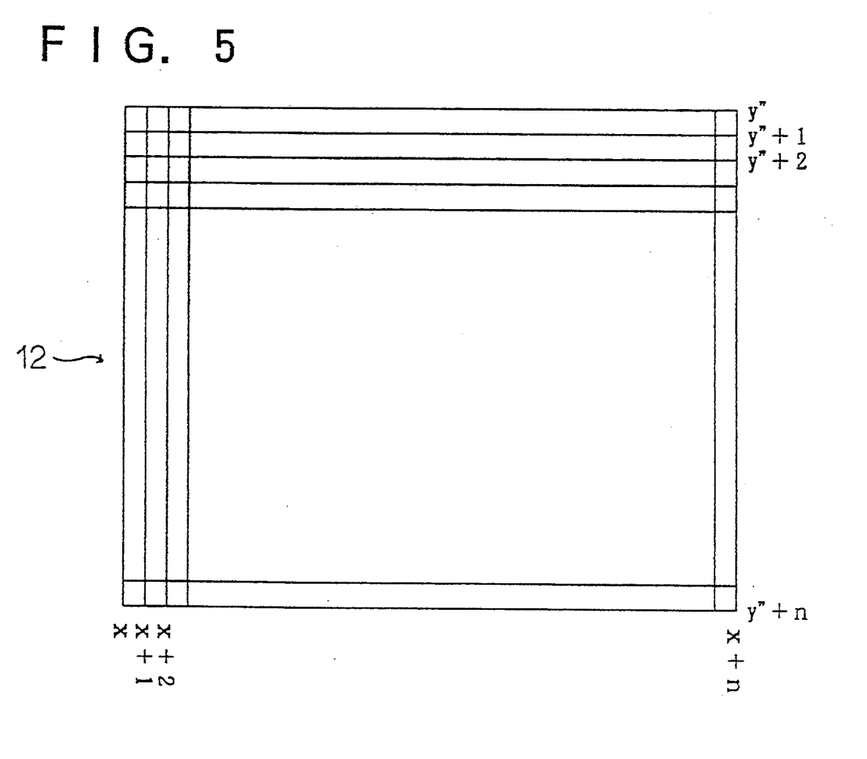
FIG. 5 is a structural drawing showing a second field of one image display portion of an image by digital signals divided into 16.
Figure 6:
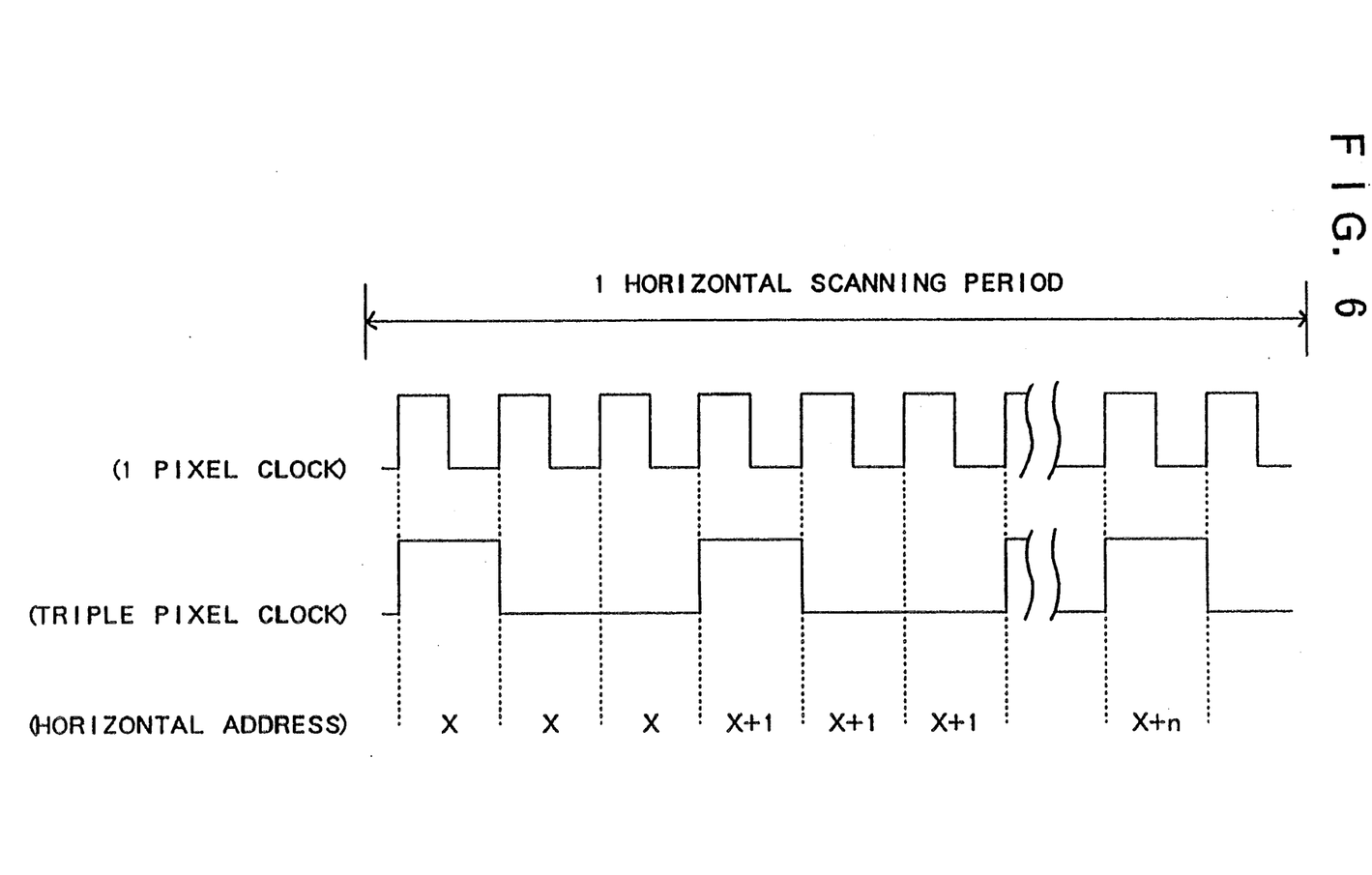
FIG. 6 is a principle enlarged view of FIG. 4.
Figure 7:
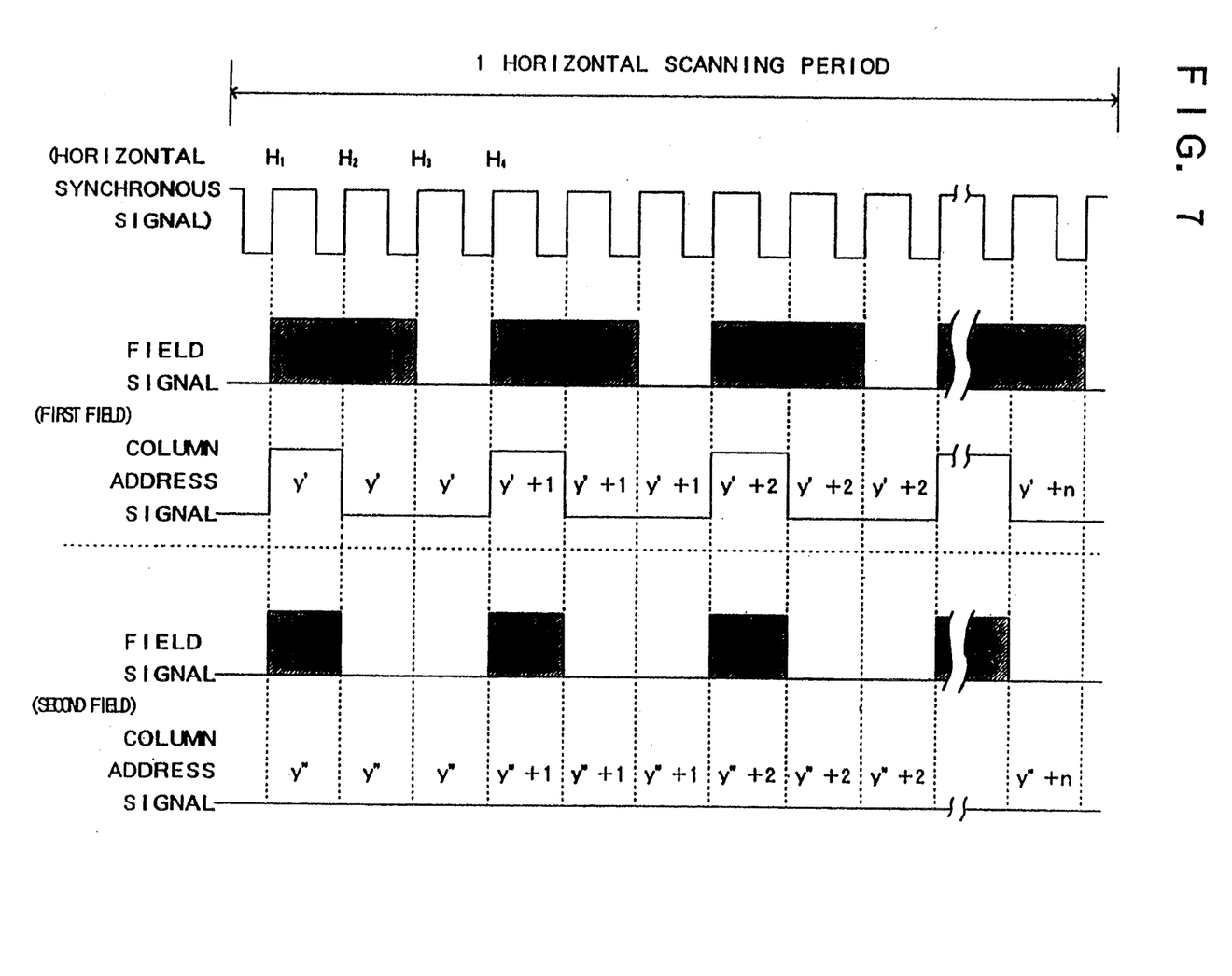
FIG. 7 is a principle enlarged view of FIG. 5.

FIG. 1 is a block diagram showing an image expansion device relating to one embodiment of this invention, FIG. 2 is an explanatory drawing showing an image equipment, FIG. 3 is an explanatory drawing showing the state that a necessary number of the image equipments of FIG. 2 are arranged in the horizontal direction and in the vertical direction, FIG. 4 is a structural drawing showing a first field of one image display portion of an image by digital signals divided into 16, FIG. 5 is a structural drawing showing a second field of one image display portion of an image by digital signals divided into 16, FIG. 6 is a principle enlarged view of FIG. 4, and FIG. 7 is a principle enlarged view of FIG. 5.

(7) is an image equipment used in this invention and the aspect proportion thereof is decided by 4:3, 16:9 and so on.

A required number of the image equipments (7) (7)—are arranged in the horizontal direction and in the vertical direction, in this embodiment, 4 units in the horizontal direction and 4 units in the vertical direction, thus 16 units in total are arranged (cf. FIG. 3).

(1) is an image expansion device to expand an image of one frame, which comprises A/D converter (3) for converting RGB signals (2) inputted from the outside, a memory block (4) including frame memory of a first field (11) and a second field (12) for storing A/D converted digital signals by the A/D converter (3), a control section (5) for controlling at least digital signals stored in said memory block (4), and D/A converter (6) for D/A converting digital signals outputted from the memory block (4).

Control section (5) is provided with image processing means (13) which expands only image display portions (8) (8)—, namely portion appearing actually on screens, of one frames of images stored in the memory block (4) by the number of the image equipments (7) (7)—arranged in the horizontal direction and in the vertical direction respectively.

That is, signal portions without image data (hereinafter called image non-display portion (9)) such as synchronizing portions are not expanded.

Control section (5) clocks the data (RGB signals (2)) inputted in the A/D converter (3) by inputted synchronizing signals.

The principle of performing the image processing to expand only image display portions (8) (8)—will be described hereinafter.

RGB signals (2) from the outside are inputted into the A/D converter (3) and converted into digital RGB signals by said A/D converter (3), then A/D converted digital RGB signals are outputted to the memory block (4).

Whereas, based on the digital RGB signals (one frame signals of image), the image processing means (13) in the control section (5) performs arithmetic by $\{(m \times d) + (m-1) \times (c-d)\} = x$ for finding the sum (x) in length of the image display portions (8) (8)—of image display equipments (7) (7)—arranged in the horizontal direction shown in FIG. 3, and performs arithmetic by $\{(m \times d) + (m-1) \times (c-d)\} \div d = x \div d$ for finding scale factor (m') of the image display portions (8) (8)—without the image non-display portions (9) (9)—in the horizontal direction.

(m) is the number of the image equipments (7) (7)—arranged in the horizontal directions, (c) is the sum in length of the image display portion (8) in the horizontal direction and the image non-display portion (9) in the horizontal direction of one image equipment (7), and (d) is the image display portion (8) in the horizontal direction of one image equipment (7). (cf. FIG. 2)

As same as the arithmetic for finding the scale factor of the image display portions (8) (8)—without the image non-display portions (9) (9)—in the horizontal direction, based on the digital RGB signals (one frame signals of image), the image processing means (13) in the control section (5) performs arithmetic by $\{(n \times b) + (n-1) \times (a-b)\} = y$ for finding the sum (y) in length of the image display portions (8) (8)—of image display equipments (7) (7)—arranged in the vertical direction shown in FIG. 3, and performs arithmetic by $\{(n \times b) + (n-1) \times (a-b)\} \div b = y \div b$ for finding scale factor (n') of the image display portions (8) (8)—without the image non-display portions (9) (9)—in the vertical direction.

(n) is the number of the image equipments (7) (7)—arranged in the vertical direction, (a) is the sum in length of the image display portion (8) in the vertical direction and the image non-display portion (9) in the vertical direction of one image equipment (7), and (b) is the image display portion (8) in the vertical direction of one image equipment (7). (cf. FIG. 2)

It is preferred to perform the following expansion processing at ratio of the scale factors (m') and (n') given by said expressions.

However, if the ratio (m'):(n') given by said expressions is large value of a prime such as 01/47, processing circuit or processing softwear is simplified by decreasing the amount of data to be processed in the interpolation to perform the following expansion processing, circuit is simplified by simplifying the clock ratio of read/write in memory, or, when the scale factors for expansion in the horizontal and vertical directions are different, the scale factors in the horizontal and vertical directions are equated to prevent the display image from being warped (in case of n=m), the values given by said arithmetic processing are converted in the ranges of $m' < m'' < 1.25 \times m'$ and $n' < n'' < 1.25 \times n'$.

The reason is that when image is displayed by one image equipment (7) display signal portion of the whole signals to be expanded is 80% respectively against the horizontal and vertical directions and 20% is used for display processing of synchronous signals and clump processing, and about 90% of said 80% is displayed by the image equipment (7).

Thus image source is provided so that when scale factors (m'') and (n'') are determined in the ranges of said expressions there is little sence of incomputability.

Then expansion processing is performed. As the expansion processing, for example, initial horizontal address of a first field (11) shown in FIG. 4 and of a second field (12) shown in FIG. 5 is x, initial vertical address of the first field is y', initial vertical address of the second field is y''.

The scale factor of the image display portion (8) (8)—without image non-display portion (9) (9)—in the horizontal direction by said arithmetic is, for example, 3 so that triple pixel clock outputting 1 pulse per 3 pixels is generated, each pixel from x to x+m in the vertical direction being shown in FIG. 6.

Horizontal addresses from x to x+m are counted up at the rising timing.

Thereby the image of horizontal scanning period expanded by 3 times per 1 pixel can be displayed in the state selected by the horizontal address.

In the vertical direction, to display one frame of said image of one horizontal scanning period obtained in horizontal direction, in horizontal synchronous signal H1 y' is selected as field signal of the first field (11) at H (High level) and y' is also selected as field signal of the second field (12) at H, each column from y' to y'+n in the vertical direction being shown in FIG. 7.

In horizontal synchronous signal H2 y' is selected as field signal of the first field (11) at H, whereas field signal of the second field (12) is at L (Low level) so that y'' is selected.

In horizontal synchronous signal H3 y'' is selected as field signal of the first field (11) at L and y'' is selected as field signal of the second field (12) at L.

Moreover in horizontal synchronous signal H4 field signal of the first field (11) is at H and column address signal is at H, so that vertical address is counted up to select y'+1.

As described above, the image of one frame expanded by 3 times both in the horizontal and vertical directions can be displayed by composing field signals outputted by 3 columns at a time reciprocally in the first field (11) and the second field (12), and column address signals outputted by one pulse in 6 horizontal scanning period.

Thus expanded image signals are D/A converted by the D/A converter (6) and outputted on image equipments (5) (5)—arranged by a required number in the horizontal direction and in the vertical direction respectively (in the embodiment, 4 units each in the horizontal direction and in the vertical direction and 16 units in total).

The present invention is not defined in the above-mentioned expansion processing so that an expansion by integer can be performed by twice read (write), thrice read (write)—n times read (write), or except the expansion by integer an expansion can be performed by providing digital interpolation filter in the horizontal direction and in the vertical direction respectively. Direct interpolation, sign interpolation and so on can be used as the interpolation method.

Thus control section (5) is provided with image processing means (13) which performs arithmetic processing on the following expressions, $\{m \times d + (m-1) \times (c-d)\} \div d$ and $\{n \times b + (n-1) \times (a-b)\} \div b$, and then performs expansion processing based on the results of the arithmetic processing to expand and display only the image display portion (8) (8)—among the images of one frames stored in the memory block (4), so that image can be expanded and displayed readily without the image data being protruded beyond the screens of the image equipments (7) (7)—arranged by a required number in the horizontal direction and in the vertical direction.

Effect of the Invention

As described above, this invention is an image expansion device which arranges a required number of image equipments in the horizontal direction and in the vertical direction respectively, expands an image of one frame in both directions by the number of image equipments arranged in the horizontal direction and by the number of image equipments arranged in the vertical direction, and displays an image; said device comprising an A/D converter for A/D converting RGB signals, a memory block for storing A/D converted digital signals, a control section for controlling at least digital signals stored in said memory block, and a D/A converter for D/A converting digital signals outputted from the memory block; and characterized in that the control section is provided with image processing means which performs arithmetic processing on the following expressions, $\{m \times d + (m-1) \times (c-d)\} \div d$ and $\{n \times b + (n-1) \times (a-b)\} \div b$, and then performs expansion processing based on the results of the arithmetic processing so that only the image display portion among the one frames stored in the memory block can be expanded and displayed, therefore the present invention has the following effect.

m is the number of image equipments arranged in the horizontal direction, c is the sum in length of the image display portion in the horizontal direction and the image non-display portion in the horizontal direction of one image equipment, d is the image display portion in the horizontal direction of one image equipment, n is the number of image equipments arranged in the vertical direction, a is the sum in length of the image display portion in the vertical direction and the image non-display portion in the vertical direction of one image equipment, and b is the image display portion in the vertical direction of one image equipment.

Namely, this invention has the effect that image can be expanded and displayed readily without the image data being protruded beyond the screens of the image equipments arranged by a required number in the horizontal direction and in the vertical direction, since control section is provided with image processing means which performs arithmetic processing on the following expressions, $\{m \times d + (m-1) \times (c-d)\} \div d$ and $\{n \times b + (n-1) \times (a-b)\} \div b$, and then performs expansion processing based on the results of the arithmetic processing to expand and display only the image display portion (8) (8)—among the images of one frames stored in the memory block (4).

I claim:

1. An image expansion device, comprising:
a required number of image display equipments being arranged in a horizontal direction and in a vertical direction, respectively, with each of said image display equipments including an image display portion and an image non-display portion; and,
an image output device to output an expanded image on said image display equipments, said image output device including an A/D converter for A/D converting RGB signals, a memory block for storing A/D converted digital signals, a control section for controlling at least digital signals stored in said memory block, and a D/A converter for D/A converting digital signals outputted from said memory block, said control section being provided with image processing means for performing arithmetic processing on the following expressions (1) and (2):

$$\{m \times d + (m-1) \times (c-d)\} \div d \quad (1)$$

wherein,
m is the number of image display equipments arranged in the horizontal direction,
c is the sum in length of the image display portion in the horizontal direction and the image non-display portion in the horizontal direction of one image display equipment, and, d is the image display portion in the horizontal direction of one of said image display equipment; and, $$\{n \times b + (n-1) \times (a-b)\} + b \qquad (2)$$

wherein,
n is the number of the image display equipments arranged in the vertical direction,
a is the sum in length of the image display portion in the vertical direction and the image non-display portion in the vertical direction of one of said image display equipment, and,
b is the image display portion in the vertical direction of one said image display equipment;
whereby, expansion processing is performed based upon the results of the arithmetic processing so that only the image display portion among the image of one frame stored in the memory block is able to be expanded and displayed.

2. The image expansion device according to claim 1, wherein said image processing means performs said arithmetic processing and then converts numerical values obtained by said arithmetic processing within the range of the following expressions (3) and (4):

$$m' < m'' < 1.25 \times m' \qquad (3)$$

wherein,
m' is a scale factor obtained from said expression (1), and
m'' is a scale factor after conversion; and, $$n' < n'' < 1.25 \times n' \qquad (4)$$

wherein,
n' is a scale factor obtained from said expression (2), and
n'' is a scale factor after conversion;
thereby performing expansion processing based on the converted numerical values.

* * * * *